(12) United States Patent
Jayakar et al.

(10) Patent No.: US 11,214,227 B2
(45) Date of Patent: Jan. 4, 2022

(54) AIRBAG WITH DEPLOYMENT OR MOVEMENT CONTROLLING TENSIONER

(71) Applicant: ZF Passive Safety Systems US Inc., Washington, MI (US)

(72) Inventors: Hylus Ranjit Raj Jayakar, Shelby Township, MI (US); Wael Youssef-Agha, Rochester Hills, MI (US); Daniel Sutherland, Richmond Township, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 58 days.

(21) Appl. No.: 16/739,492

(22) Filed: Jan. 10, 2020

(65) Prior Publication Data

US 2021/0213906 A1 Jul. 15, 2021

(51) Int. Cl.
*B60R 21/2338* (2011.01)
*B60R 21/232* (2011.01)
*B60R 21/213* (2011.01)
*B60R 21/231* (2011.01)

(52) U.S. Cl.
CPC ........ *B60R 21/2338* (2013.01); *B60R 21/213* (2013.01); *B60R 21/232* (2013.01); *B60R 21/23138* (2013.01)

(58) Field of Classification Search
CPC ................ B60R 21/213; B60R 21/214; B60R 21/23138; B60R 21/232; B60R 21/2338; B60R 2021/161; B60R 2021/23386; B60R 2021/23388
See application file for complete search history.

(56) References Cited

U.S. PATENT DOCUMENTS

| 5,265,903 | A | * | 11/1993 | Kuretake | B60R 21/213 280/730.2 |
|---|---|---|---|---|---|
| 5,842,344 | A | | 12/1998 | Schmid | |
| 5,924,722 | A | * | 7/1999 | Koide | B60R 21/2338 280/730.2 |
| 5,924,723 | A | * | 7/1999 | Brantman | B60R 21/232 280/730.2 |
| 5,975,566 | A | * | 11/1999 | Bocker | B60R 21/213 280/730.2 |
| 6,168,193 | B1 | * | 1/2001 | Shirk | B60R 21/232 280/730.2 |
| 6,168,194 | B1 | * | 1/2001 | Cuevas | B60R 21/232 280/730.2 |

(Continued)

*Primary Examiner* — Laura Freedman
(74) *Attorney, Agent, or Firm* — Tarolli, Sundheim, Covell & Tummino LLP

(57) ABSTRACT

An apparatus for helping to protect an occupant of a vehicle includes a curtain airbag inflatable from a stored condition adjacent a roof of the vehicle to a deployed condition in which the curtain airbag is positioned between a side structure of the vehicle and the vehicle occupant. A tensioner is positioned adjacent to the vehicle roof and spaced inboard from the vehicle side structure. A tether has a first end portion connected to the tensioner and a second end portion connected to the curtain airbag. The tensioner is configured to pay-out and/or retract the tether. The tensioner is configured to control pay-out and/or retraction of the tether to control deployment of the curtain airbag and/or to control movement of the curtain airbag once deployed.

15 Claims, 5 Drawing Sheets

(56) References Cited

U.S. PATENT DOCUMENTS

| | | | |
|---|---|---|---|
| 6,241,277 B1 * | 6/2001 | Heigl | B60R 21/232 |
| | | | 280/730.2 |
| 6,308,982 B1 * | 10/2001 | Wallner | B60R 21/232 |
| | | | 280/730.2 |
| 6,431,588 B1 | 8/2002 | Bayley et al. | |
| 6,688,641 B2 * | 2/2004 | Dominissini | B60R 21/232 |
| | | | 280/730.2 |
| 6,709,010 B2 * | 3/2004 | Dominissini | B60R 21/232 |
| | | | 280/730.2 |
| 6,722,691 B1 * | 4/2004 | Håland | B60R 21/233 |
| | | | 280/730.1 |
| 6,733,035 B2 * | 5/2004 | Thomas | B60R 21/232 |
| | | | 280/730.2 |
| 7,380,853 B2 * | 6/2008 | Wells | B60R 21/026 |
| | | | 280/749 |
| 7,559,572 B2 * | 7/2009 | Roberts | B60R 21/232 |
| | | | 280/730.2 |
| 7,712,774 B2 * | 5/2010 | Garner | B60R 21/2338 |
| | | | 280/730.2 |
| 7,748,741 B2 * | 7/2010 | Mitchell | B60R 21/213 |
| | | | 280/743.2 |
| 9,475,454 B2 | 10/2016 | Betz et al. | |
| 10,315,617 B2 | 6/2019 | Franz et al. | |
| 10,589,708 B2 * | 3/2020 | Cho | B60R 21/2338 |
| 2002/0070537 A1 * | 6/2002 | Webber | B60R 21/2338 |
| | | | 280/730.2 |
| 2005/0001412 A1 * | 1/2005 | Schneider | B60R 21/232 |
| | | | 280/730.1 |
| 2006/0043706 A1 * | 3/2006 | Kosugi | B60R 21/08 |
| | | | 280/730.2 |
| 2011/0285115 A1 * | 11/2011 | Putala | B60R 21/2338 |
| | | | 280/730.2 |

\* cited by examiner

AIRBAG WITH DEPLOYMENT OR MOVEMENT CONTROLLING TENSIONER

FIELD OF THE INVENTION

The invention relates to an apparatus for helping to protect an occupant of a vehicle. More particularly, the invention relates to an airbag inflatable between a vehicle occupant and a side structure of a vehicle.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that is fixed to the roof of the vehicle and/or to a support structure adjacent to the roof of the vehicle. The inflatable curtain is configured to inflate from the roof of the vehicle downward inside the passenger compartment in the event of a side impact or a vehicle rollover. The inflatable curtain, when inflated, is positioned between a vehicle occupant and the side structure of the vehicle and helps to protect the vehicle occupant from impacting the side structure and from being ejected from the vehicle.

Portions of certain inflatable curtains in certain vehicle models are at risk of deploying on and/or outboard of the vehicle. Having portions of the curtain airbag deploying on and/or outboard of the vehicle is undesirable because those portions might not be positioned between a vehicle occupant and the side structure of the vehicle. Further, the at risk portions of the curtain airbag might deploy to a position that is outboard of the vehicle and provide little or no projection to the vehicle occupant. To prevent this undesirable deployment, certain inflatable curtains include tethers for controlling the deployment of the inflatable curtain.

SUMMARY OF THE INVENTION

According to one aspect, an apparatus for helping to protect an occupant of a vehicle includes a curtain airbag inflatable from a stored condition adjacent a roof of the vehicle to a deployed condition in which the curtain airbag is positioned between a side structure of the vehicle and the vehicle occupant. A tensioner is positioned adjacent to the vehicle roof and spaced inboard from the vehicle side structure. A tether has a first end portion connected to the tensioner and a second end portion connected to the curtain airbag. The tensioner is configured to pay-out and/or retract the tether. The tensioner is configured to control pay-out and/or retraction of the tether to control deployment of the curtain airbag and/or to control movement of the curtain airbag once deployed.

According to another aspect, alone or in combination with any other aspect, the tensioner can be configured to retract the tether when the curtain airbag is deployed to urge the curtain airbag in an inboard direction.

According to another aspect, alone or in combination with any other aspect, the tensioner can be configured to increase tension on the tether as the tensioner retracts the tether in order to counteract outboard directed forces exerted by an outboard moving vehicle occupant.

According to another aspect, alone or in combination with any other aspect, the first end portion of the tether can be connected to a lower portion of the curtain airbag. The tensioner can be configured to retract the tether to limit and/or prevent the lower portion of the curtain airbag from moving outboard of the vehicle.

According to another aspect, alone or in combination with any other aspect, the tensioner can include a pretensioner that is actuatable to retract portions of the tether into the tensioner.

According to another aspect, alone or in combination with any other aspect, the tensioner can be configured to limit and/or prevent a portion of the curtain airbag from moving outboard of the vehicle.

According to another aspect, alone or in combination with any other aspect, the tensioner can be positioned on a vehicle centerline. The tether can urge the curtain airbag toward the vehicle centerline as the curtain airbag deploys.

According to another aspect, alone or in combination with any other aspect, the first end portion of the tether can be connected to a lower portion of the curtain airbag. As the curtain airbag inflates and deploys, the tether can be tensioned causing the tensioner to payout the tether. The tensioner can be configured to tension the tether during pay-out so that the tensioned tether prevents the lower portion of the curtain airbag from deploying outboard of the vehicle.

According to another aspect, alone or in combination with any other aspect, the tensioner can be positioned in a mounting space between the headliner of the vehicle and the vehicle roof. The stored curtain airbag can be mounted adjacent an intersection of the vehicle roof and the vehicle side structure. The tether can extend between the vehicle headliner and the vehicle roof from the tensioner to the stored curtain airbag.

According to another aspect, alone or in combination with any other aspect, in the deployed condition of the curtain airbag, the tether can have a first portion that extends from the mounting space into a passenger compartment of the vehicle and a second portion that extends in the mounting space between the vehicle headliner and the vehicle roof.

According to another aspect, alone or in combination with any other aspect, in the deployed condition of the curtain airbag, the curtain airbag can extend along the vehicle side structure, a first portion of the tether can extend from the mounting space along the vehicle side structure with the deployed curtain airbag, and a second portion of the tether can extend in the mounting space between the vehicle headliner and the vehicle roof.

According to another aspect, alone or in combination with any other aspect, when the curtain airbag is in the stored condition, the curtain airbag can be rolled and/or folded and a portion of the tether can be positioned within the rolls and/or folds of the curtain airbag.

According to another aspect, alone or in combination with any other aspect, a method of protecting an occupant of a vehicle can include providing the apparatus for helping to protect an occupant of a vehicle. The curtain airbag can be inflated from the stored condition to the deployed condition upon the occurrence of an event for which inflation of the curtain airbag is desired. The tensioner can be actuated to retract a portion of the tether into the tensioner prior to or once an outboard moving vehicle occupant impacts the deployed curtain airbag. The tensioner can increase tension on the tether as the tensioner retracts the tether in order to counteract the outboard directed forces exerted by the outboard moving vehicle occupant onto the curtain airbag and to limit and/or prevent a portion of the curtain from moving outboard of the vehicle.

According to another aspect, alone or in combination with any other aspect, an airbag module can include the apparatus for helping to protect an occupant of a vehicle. The airbag module can also include an inflator operably connected to the curtain airbag for inflating and deploying the curtain airbag from the stored condition to the deployed condition.

According to another aspect, alone or in combination with any other aspect, a vehicle safety system can include the airbag module and an airbag controller operatively connected to the inflator and configured to actuate the inflator in response to sensing the occurrence of an event for which occupant protection is desired.

BRIEF DESCRIPTION OF THE DRAWINGS

The foregoing and other features of the invention will become apparent to one skilled in the art to which the invention relates upon consideration of the following description of the invention with reference to the accompanying drawings, in which.

DETAILED DESCRIPTION OF THE INVENTION

Figure 1:
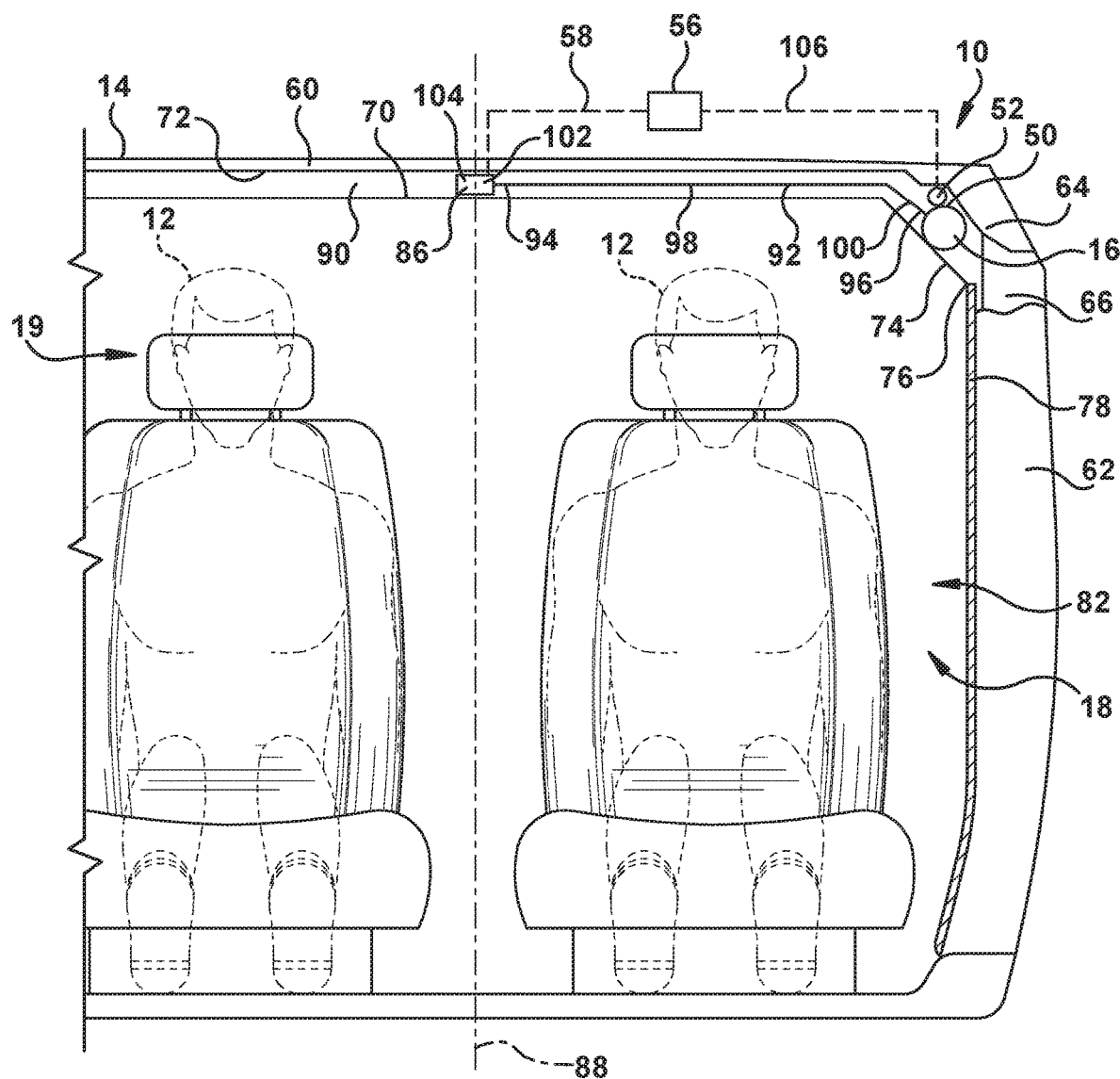
FIG. 1 is a schematic front view illustrating an apparatus for helping to protect an occupant of a vehicle, including a portion of the apparatus in a first condition.

An apparatus 10 for helping to protect an occupant 12 of a vehicle 14 includes an inflatable vehicle occupant protection device 16 in the form of an airbag, such as a curtain airbag, for helping to protect the occupant in the event of a side impact to the vehicle. In the embodiment illustrated in FIGS. 1-5, the curtain airbag 16 is shown on a driver side 18 of the vehicle 14 for helping to protect driver side vehicle occupants. Those skilled in the art will appreciate that the apparatus 10 disclosed herein could be adapted for use on a passenger side 19 of the vehicle 14 for helping to protect passenger side vehicle occupants.

As shown in the example configuration of FIGS. 2-5, the curtain airbag 16 includes panels 20, 22 of material that are arranged in an overlying manner. Overlapping portions of the panels 20, 22 are interconnected along at least a portion of a perimeter 24 of the curtain airbag 16 to form a perimeter seam 26 of the curtain airbag. The perimeter seam 26 is a non-inflatable portion of the curtain airbag 16 that helps define an inflatable volume 28 of the curtain airbag. The perimeter seam 26 of the curtain airbag 16 is defined at least partially by an upper edge seam 30 at an upper portion 32 of the curtain airbag, a lower edge seam 34 at a lower portion 36 of the curtain airbag, a rear edge seam 38 at a rear portion 40 of the curtain airbag, and a front edge seam 42 at a front portion 44 of the curtain airbag. The rear and front edge seams 38, 42 are spaced apart along the upper and lower edge seams 30, 34 and extend between the upper and lower edge seams. The curtain airbag 16 can also include interior seams in which the overlying panels 20, 22 are interconnected within the perimeter 24 to form non-inflatable portions that help define inflatable chambers of the curtain airbag.

The curtain airbag 16 can be constructed of any suitable material, such as nylon (e.g., woven nylon 6-6 yarns), and can be constructed in any suitable manner. For example, the curtain airbag 16 may have a one-piece woven construction in which the overlying panels 20, 22 are woven simultaneously as a single piece of material. As another example, the overlying panels 20, 22 can be formed from separate pieces of material. If the panels 20, 22 are formed from separate pieces of material, the panels can be interconnected by known means, such as stitching, ultrasonic welding, heat bonding, or adhesives, to form the curtain airbag 16. The curtain airbag 16 can be uncoated, coated with a material, such as a gas impermeable urethane, or laminated with a material, such as a gas impermeable film. The curtain airbag 16 thus can have a gas-tight or substantially gas-tight construction. Those skilled in the art will appreciate that alternative materials, such as polyester yarn, and alternatives coatings, such as silicone, can also be used to construct the curtain airbag 16.

As shown in FIGS. 1-5, the curtain airbag 16 can be a part of an airbag module 50 that includes an inflator 52 operably connected to the inflatable volume 28 of the curtain airbag. As shown the example configuration of FIGS. 3-5, the curtain airbag 16 has an inflator mouth 54 in fluid communication with the inflatable volume 28. The inflator 52 can be connected to and/or received in the inflator mouth 54 of the curtain airbag 16. The inflator 52 is actuatable to provide inflation fluid to the inflatable volume 28 of the curtain airbag 16 to inflate and deploy the curtain airbag. The inflator 52 can be of any known type, such as stored gas, solid propellant, augmented, or hybrid. As shown in FIGS. 1-5, an airbag controller 56 can be operatively connected to the inflator 52 via lead wires 58. The airbag controller 56 is configured to actuate the inflator 52 in response to sensing the occurrence of an event for which occupant protection is desired, such as a collision.

As shown in FIG. 1, the airbag module 50 can be installed in the vehicle 14 as a unit. To install the airbag module 50 in the vehicle 14, the curtain airbag 16 is deflated and flattened. The deflated and flattened curtain airbag 16 is rolled and/or folded, such as by rolling and/or folding the lower portion 36 of the curtain airbag toward the upper portion 32 of the curtain airbag. Once the curtain airbag 16 is rolled and/or folded, the curtain airbag can be packaged. By "package" or "packaged," it is meant that the curtain airbag 16 is maintained in the rolled and/or folded condition so that the curtain airbag and certain associated components, such as the inflator 52, fill tubes, connectors, etc., can be installed in the vehicle 14 as a unit. Reference to the "packaged curtain airbag," "the curtain airbag package," and/or the like means a curtain airbag 16 that is maintained in the rolled and/or folded condition so that the curtain airbag is in a ready-to-install condition.

Once the curtain airbag 16 has been packaged, the inflator 52 can be connected to and/or received in the inflator mouth 54 of the curtain airbag. The packaged curtain airbag 16 and attached inflator 52 of the airbag module 50 can then be installed in the vehicle 14 as a unit.

Figure 2:
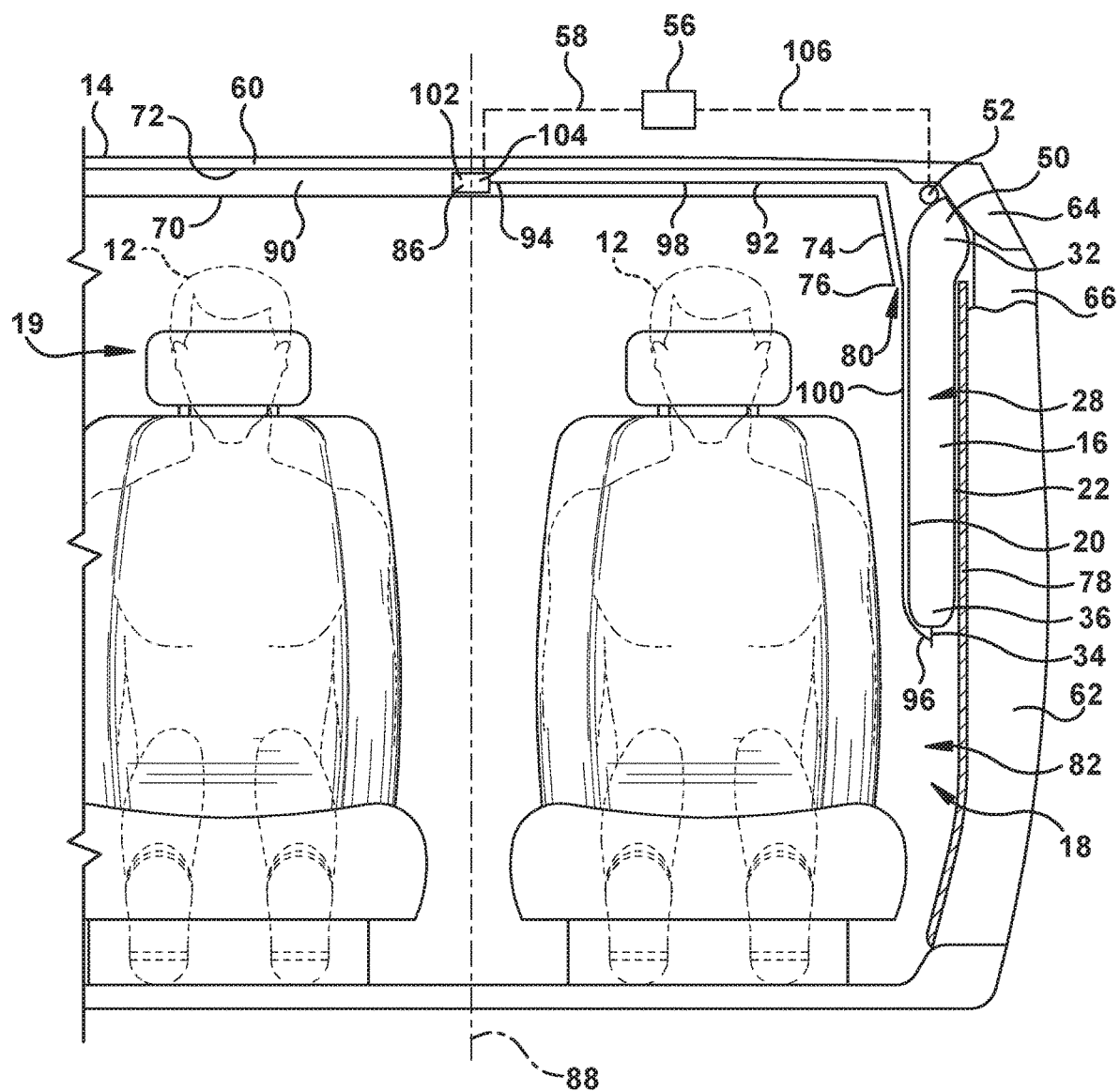
FIG. 2 is a schematic front view illustrating the apparatus of FIG. 1, including a portion of the apparatus in a second condition.

In the example configuration of FIGS. 1-2, the vehicle 14 includes a vehicle roof 60, a vehicle side structure 62, and a vehicle roof rail 64. The vehicle side structure 62 includes one or more pillars 66 and at least one side window 68. The vehicle roof rail 64 is located at the intersection of the vehicle side structure 62 and the vehicle roof 60. The vehicle 14 also includes a headliner 70 that extends adjacent to, but spaced apart from, an inner surface 72 of the vehicle roof 60. The headliner 70 has a portion 74 that extends at an acute angle relative to the vehicle roof 60 toward the vehicle side structure 62. In a stored condition of the curtain airbag 16, a terminal end 76 of the headliner 70 is in abutting engagement with at least a trim piece 78 that overlies a pillar 66.

When installed in the vehicle 14, the airbag module 50 can be mounted adjacent the vehicle roof 60 and/or the vehicle side structure 62 in any known manner. As shown in the example configuration of FIG. 1, the curtain airbag, when in the stored condition, is in the packaged condition, mounted to the vehicle roof rail 64, and positioned between the headliner 70 and the vehicle roof rail. The angled portion 74 of the headliner 70 overlies the stored curtain airbag 16 and conceals the stored curtain airbag in the vehicle 14. The inflator 52 can be mounted adjacent to the stored curtain airbag 16, such as to the vehicle roof rail 64, the vehicle roof 60, or the vehicle side structure 62, and can be concealed by the headliner 70.

Those skilled in the art will recognize that the configuration of the vehicle structure, and thus the spatial and interconnecting relationships between the vehicle structure (i.e., the vehicle side structure 62, the vehicle roof 60, and the vehicle roof rail 64) and the headliner 70, trim piece 78 and airbag module 50, may vary depending upon the particular design of the vehicle 14. Therefore, it will be appreciated that the vehicle structure illustrated in FIGS. 1-5 and the spatial and interconnecting relationships between the vehicle structure and the headliner 70, the trim piece 78, and the airbag module 50 is for illustrative purposes and may vary as desired.

As shown in the example configuration of FIGS. 1-2, upon the occurrence of an event for which occupant protection is desired, such as a collision, the airbag controller 56 actuates the inflator 52 to provide inflation fluid to the inflatable volume 28 of the curtain airbag 16 to inflate and deploy the curtain airbag from the stored condition to a deployed condition. The deploying curtain airbag 16 deploys downward away from the vehicle roof rail 64 and into the angled portion 74 of the headliner 70. The terminal end 76 of the headliner 70 disengages from the trim piece 78 under the deployment forces of the deploying curtain airbag 16. This creates an opening 80 through which the curtain airbag 16 can pass into a passenger compartment 82 of the vehicle 14 to reach the deployed condition. As shown in FIG. 2, the curtain airbag 16, when in the deployed condition, extends along the vehicle side structure 62 and is positioned between the vehicle side structure and the vehicle occupant 12.

To help ensure that the curtain airbag 16 deploys to a position that is between the vehicle side structure 62 and the vehicle occupant 12, and thus substantially provides the proper protection for the vehicle occupant, the curtain airbag should deploy inboard of the vehicle side structure (i.e., inboard of the vehicle 14). Certain features of the vehicle 14 and the apparatus 10 cause portions of the curtain airbag 16 to deploy to a position that is inboard of the vehicle side structure 62. As the curtain airbag 16 deploys downward in the vehicle 14, portions of the curtain airbag can engage portions of the vehicle side structure 62. This engagement between the vehicle side structure 62 and the curtain airbag 16 helps prevent portions of the curtain airbag from deploying to a position that is outboard of the vehicle side structure. For example, the one or more pillars 66 can engage the deploying curtain airbag 16 and help prevent portions of the curtain airbag adjacent the one or more pillars 66 from being positioned outboard of the vehicle side structure 62. Further, the curtain airbag 16 can have at least one mounting tab 84 (FIGS. 3-5) along the upper portion 32 of the curtain airbag that holds the upper portion of the curtain airbag inboard of the vehicle side structure 62 and helps prevent the upper portion of the curtain airbag from deploying to a position outboard of the vehicle side structure.

Even with the one or more pillars 66 and the at least one mounting tab 84, without additional protections, other portions of the curtain airbag 16 can still be at risk of deploying outboard of the vehicle side structure 62, and thus outboard of the vehicle 14. In certain vehicle models, the lower portion 36 of the curtain airbag 16 can be at risk of deploying outboard of the vehicle side structure 62, such as through the at least one side window 68. To prevent this undesirable deployment, the apparatus 10 includes at least one tensioner 86 that controls the deployment of the curtain airbag 16. Although the below description largely describes the at least one tensioner 86 as helping to prevent the lower portion of the curtain airbag 16 from this undesirable deployment, those skilled in the art will appreciate that the at least one tensioner could be adapted to help prevent any other portion of the curtain airbag, such as, but not limited to, the rear and front portions 40, 44 of the curtain airbag, from similar undesirable deployments.

As shown in the example configurations of FIGS. 1-2, the apparatus 10 is shown as having a tensioner 86 positioned inboard of the vehicle side structure 62, for example, on or near a vehicle centerline 88, in a mounting space 90 between the headliner 70 and the vehicle roof 60. The tensioner 86 is connected to the curtain airbag 16 through a tether 92. A first end portion 94 of the tether 92 is connected to the tensioner 86. A second end portion 96 of the tether 92 is connected to the curtain airbag 16 at and/or adjacent to the lower portion 36 of the curtain airbag by known means, such as by stitching, ultrasonic welding, heat bonding, adhesives, fasteners, or any combination thereof.

In the example configuration depicted in FIGS. 1-5, the second end portion 96 of the tether 92 is connected to the lower edge seam 34 of the curtain airbag 16. Because of the tether's 92 connection to the curtain airbag 16, at least a portion of the tether can be rolled and/or folded with the curtain airbag so that a portion of the tether is positioned within the rolls and/or folds of the stored curtain airbag. Alternatively, the curtain airbag 16 can be rolled and/or folded so that only a portion or none of the tether 92 is rolled and/or folded with the curtain airbag.

The tether 92 can be formed from a length of material, such as from a single length of material or from a plurality of lengths of material that are connected to one another to collectively form the length of material. The material used to form the tether 92 can be the same material as the curtain airbag 16, the same material as a seat belt webbing, e.g., polyester or nylon, or any other appropriate material.

As shown in the example configuration of FIG. 1, when the curtain airbag 16 is in the stored condition, the tether 92 extends between the headliner 70 and the vehicle roof 60 from the tensioner 86 to the stored curtain airbag. As shown in the example configuration of FIG. 2, when the curtain airbag 16 is in the deployed condition, a first portion 98 of the tether 92 extends in the mounting space 90 between the headliner 70 and the vehicle roof 60. A second portion 100 of the tether 92 extends from the mounting space 90 into the passenger compartment 82 along the vehicle side structure 62 with the deployed curtain airbag 16.

In order to control the deployment of the curtain airbag 16 and help ensure that the curtain airbag deploys inboard of the vehicle side structure 62, the tensioner 86 can include a retractor 102 that is configured to pay-out the tether 92 and control the pay-out of the tether. The retractor 102 can be configured similar or identical to any type of retractor known in the art that can be configured to pay-out the tether 92 as desired. For example, the retractor 102 can comprise, or comprise a modified version of, the belt retractor disclosed in U.S. Pat. No. 10,315,617 to Franz et al., or the belt retractor disclosed in U.S. Pat. No. 5,842,344 to Schmid, the subject matter of each of which is incorporated herein by reference.

The retractor 102 can include a spool upon which a portion of the tether 92 is wound prior to the deployment of the curtain airbag 16. The tether 92 is urged to remain wound upon the spool by the bias of a spring mechanism, such as a torsion spring, in the retractor 102. As the curtain airbag 16 inflates to the deployed condition, the curtain airbag pulls the second end portion 96 of the tether 92 downward away from the tensioner 86. As a result, the tether 92 becomes tensioned between the first and second end portions 94, 96. The tension in the tether 92 produces a force that overcomes the bias of the spring mechanism. The tension in the tether 92 thus causes the retractor 102 to pay-out the tether against the bias of the spring mechanism.

The retractor 102, however, may not permit the curtain airbag 16 to deploy uninhibited once the retractor begins paying-out the tether 92. As the curtain airbag 16 deploys, the retractor 102 can be configured to only pay-out the amount of tether 92 necessary for the curtain airbag to continuously deploy downward along the vehicle side structure 62 to the deployed condition. This is because the tether 92 is continuously paying-out against the bias of the spring mechanism as the curtain airbag 16 deploys to the deployed condition. The bias provided by the spring mechanism can be selected so that the retractor 102 does not pay-out enough tether 92 for the curtain airbag 16 to deploy outboard of the vehicle side structure 62 at any point during deployment.

By restricting the pay-out of the tether 92 with the spring mechanism, the retractor 102 creates tension in the tether during pay-out. Tensioning the tether 92 during pay-out can also help prevent the lower portion 36 of the curtain airbag 16 from deploying outboard of the vehicle side structure 62. This is because the tension in the tether can cause the tether 92 to urge the lower portion 36 of the deploying curtain airbag 16 inboard, toward the vehicle centerline 88 (i.e., toward the tensioner 86) and away from the vehicle side structure 62. By urging the deploying curtain airbag 16 inboard, the retractor 102, through the tether 92, limits and/or prevents the lower portion 36 of the curtain airbag from deploying outboard of the vehicle side structure 62.

Once the curtain airbag 16 reaches the deployed condition, the retractor 102 ceases paying-out the tether 92. This is because the curtain airbag 16 no longer exerts downward deployment forces onto the tether 92 once the curtain airbag reaches the deployed condition. Additionally or alternatively, the retractor can cease paying out the tether once the curtain airbag reaches the deployed condition because of the retractor having payed-out all of the tether that was wound upon the spool pre-deployment.

Once in the deployed condition, fluid pressure in the curtain airbag 16 can act on the tether 92 against the bias of the spring mechanism to substantially prevent the tether from being retracted back into the retractor 102. As shown in FIG. 2, the fluid pressure can thus maintain the curtain airbag 16 deployed along the vehicle side structure 62. Although a substantial portion of the curtain airbag 16 is shown as being deployed against the vehicle side structure 62, a portion of the deployed curtain airbag, such as the lower portion 36, can be in a position that is at least partially spaced from the vehicle side structure toward the vehicle centerline 88 because of the tension in the tether 92 and/or the length of the tether that was payed-out of the retractor 102 during deployment.

In addition to the tensioner 86 controlling the deployment of the curtain airbag 16, the tensioner can also control the movement of the curtain airbag once in the deployed condition. For example, in certain collisions, the vehicle occupant 12 can move in an outboard direction and impact the deployed curtain airbag 16. These outboard directed forces exerted by the outboard moving vehicle occupant 12, if left unchecked, could cause portions of the curtain airbag 16, such as the lower portion 36, to move outboard of the vehicle side structure 62 (i.e., outboard of the vehicle 14). The vehicle occupant 12 can move outboard with the curtain airbag 16.

The retractor 102 and/or the tether 92 can, however, be configured to inhibit further tether payout once the curtain airbag 16 reaches the deployed condition. This can, for example, be done by configuring the tether 92 and/or retractor 102 so that there is no additional tether to be payed-out once the curtain airbag reaches the deployed condition. As a result, the outboard directed forces exerted on the deployed curtain airbag 16 thus increase the tension in the tether 92 instead of causing the retractor 102 to pay-out the tether. The tensioned tether 92 counteracts the outboard directed forces and helps to limit and/or prevent portions of the curtain airbag 16 from moving outboard. Even if portions of the curtain airbag 16 are momentarily moved outboard of the vehicle side structure 62 by the outboard directed forces, the tension in the tether 92 will tend to cause the tether to pull the outboard moved portions of the curtain airbag back inboard of the vehicle side structure.

The tensioner 86 can also comprise a pretensioner 104 that is configured to further help control the movement of the deployed curtain airbag 16. The pretensioner 104 is actuatable to retract portions of the tether 92 into the tensioner 86. The pretensioner 104 can be configured similar or identical to known tether pretensioners. For example, the pretensioner 104 can be configured similar or identical to the rotary belt tensioner disclosed in U.S. Pat. No. 9,475,454 to Betz et al., the piston-in-tube type tensioning device disclosed in U.S. Pat. No. 6,431,588 to Bayley et al., the "power snake" pretensioner disclosed in U.S. Pat. No. 10,315,617 to Franz et al., or the linear drive and belt pretensioner disclosed in U.S. Pat. No. 5,842,344 to Schmid, the subject matter of each of which is incorporated herein by reference.

Figure 3:
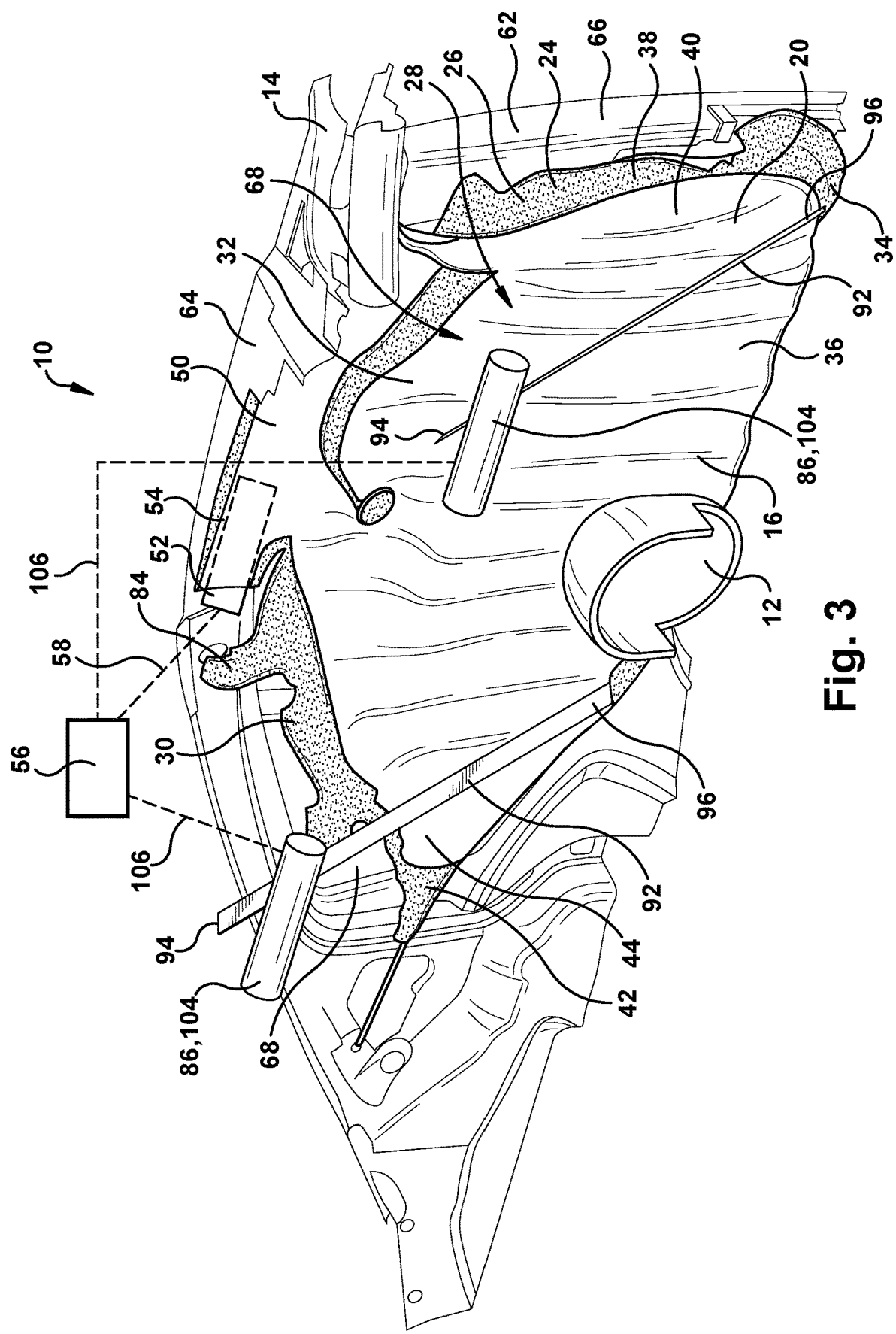
FIGS. 3-5 illustrate an example sequence of operation of a portion of the apparatus of FIG. 1.
Figure 4:
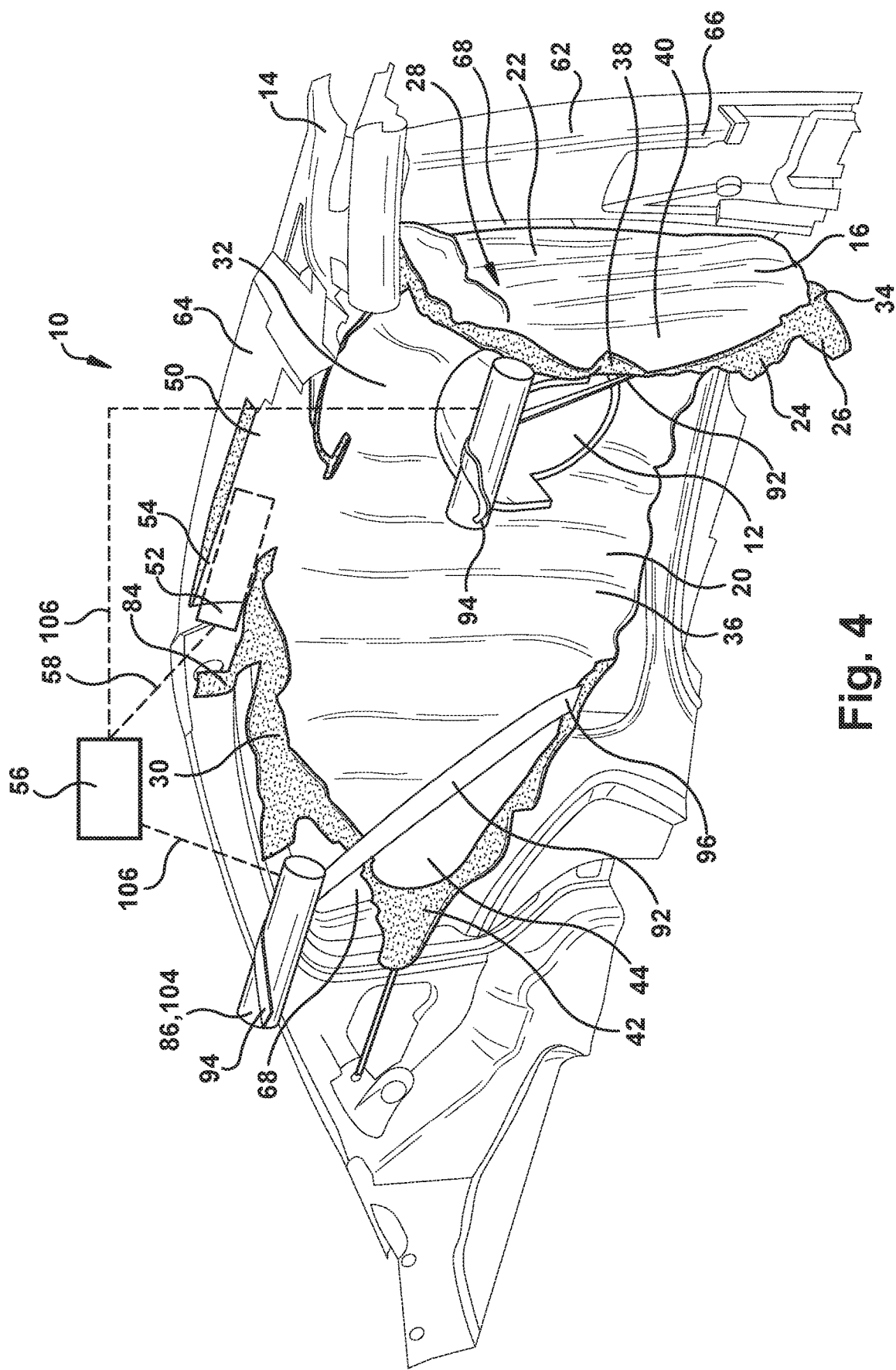
Figure 5:
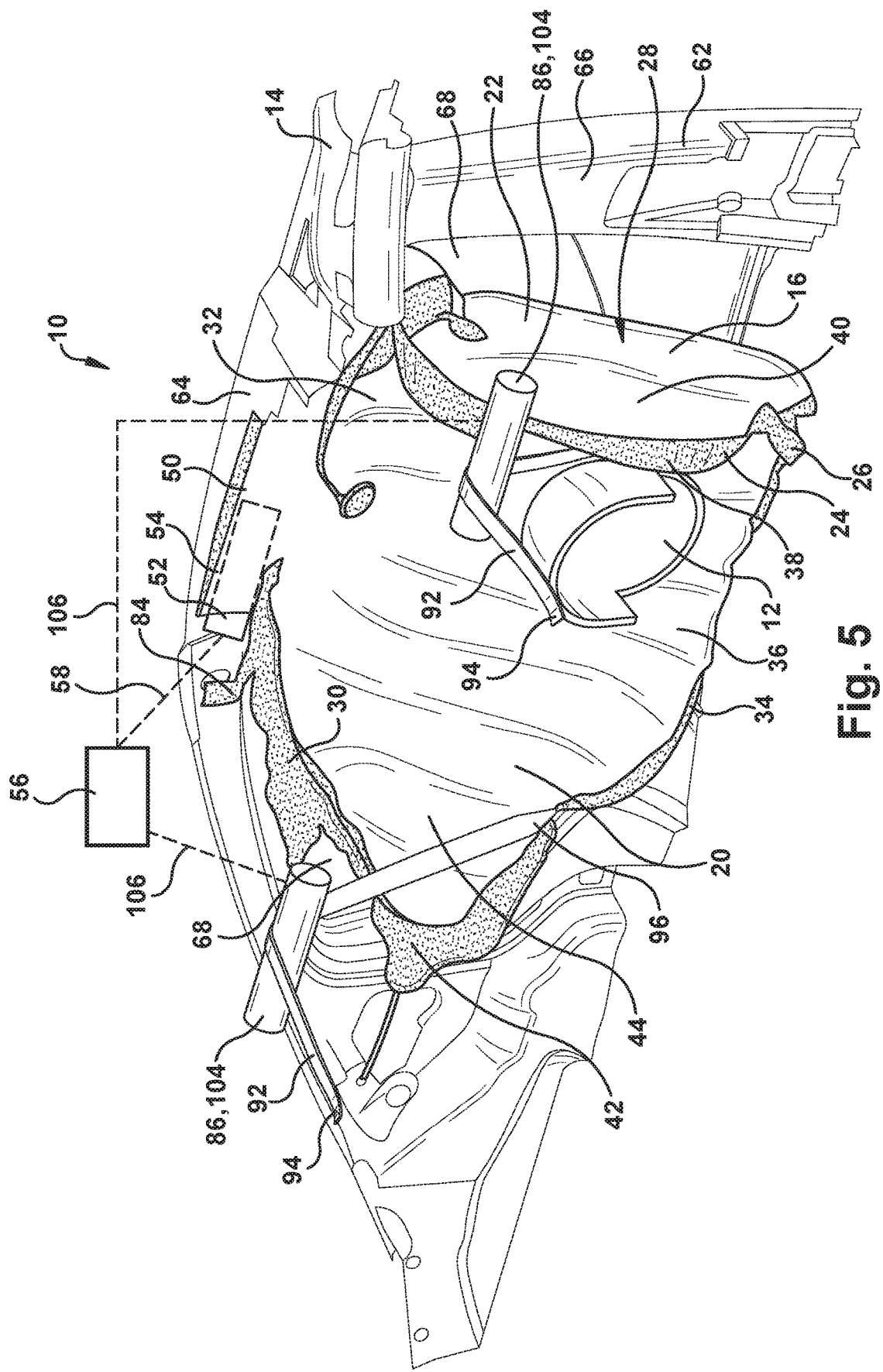

As shown in FIGS. 1-2, the pretensioner 104 can be operatively connected to the airbag controller 56, or any other appropriate controller, via lead wires 106. FIGS. 3-5, schematically illustrate an example operation of the pretensioner 104 during a collision in which the vehicle occupant 12 is moved in the outboard direction. As shown in the example configuration of FIGS. 3-5, the apparatus 10 can include two tensioners 86, each of which include a pretensioner 104, with associated tethers 92. The airbag controller 56 is configured to actuate the inflator 52 in response to sensing a collision so that the curtain airbag 16 can be deployed to the deployed condition as shown in FIG. 3. As shown in FIGS. 3-4, the vehicle occupant 12, in response to the collision, can move in the outboard direction and impact the curtain airbag 16. Impacting the deployed curtain airbag 16 in this manner could cause portions of the deployed curtain airbag to move outboard of the vehicle side structure 62 through at least one of the side windows 68.

To limit and/or prevent the deployed curtain airbag 16 and the vehicle occupant 12 from being moved outboard of the vehicle side structure 62, the airbag controller 56 can be configured to actuate the pretensioners 104 prior to or once the outboard moving vehicle occupant impacts the deployed curtain airbag. As shown in FIG. 5, actuation of the pretensioners 104 causes a portion of the tethers 92 to be retracted into the tensioners 86. The tension in the tethers 92 increases as the pretensioners 104 retract the tethers. This increase in tension moves the curtain airbag 16 inboard, which helps to counteract the outboard directed forces and to limit and/or prevent portions of the curtain airbag from moving outboard of the vehicle 14.

The retraction of the tethers 92 can also cause the lower portion 36 of the curtain airbag 16 to be urged and/or pulled inboard toward the vehicle centerline 88 (i.e., toward the pretensioners 104) and away from the vehicle side structure 62, which helps to limit and/or prevent the curtain airbag 16 from moving outboard of the vehicle 14. Further, even if portions of the curtain airbag 16 are momentarily moved outboard of the vehicle side structure 62 by the outboard directed forces, the outboard moved portions of the curtain airbag will tend to be urged and/or pulled back inboard of the vehicle side structure and toward the vehicle centerline 88 by the retracting tethers 92.

In addition to controlling the movement of the deployed curtain airbag 16, the pretensioner 104 can be configured to control the deployment of the curtain airbag. For example, the pretensioner 104 can be configured to retract portions of the tether 92 as the curtain airbag 16 deploys. This retraction causes portions of the curtain airbag 16, such as the lower portion 36, to be urged and/or pulled toward the vehicle centerline 88 as the curtain airbag deploys to help limit and/or prevent the curtain airbag from deploying outboard of the vehicle side structure 62.

Advantageously, by controlling the deployment of the curtain airbag 16 and/or the movement of the deployed curtain airbag, the tensioner 86 helps ensure that the curtain airbag is in a position to help protect the vehicle occupant 12 from impacting the vehicle side structure 62 and from being ejected from the vehicle 14.

Although the tensioner 86 of the apparatus 10 has been described as comprising the retractor 102 for paying-out the tether 92 and the pretensioner 104 for retracting the tether, the tensioner can also be configured to include only the retractor or only the pretensioner. In the configuration in which the tensioner 86 includes only the retractor 102, the retractor operates in the same manner as described above to control deployment of the curtain airbag 16 and the movement of the curtain airbag when the curtain airbag is in the deployed condition. In the configuration in which the tensioner 86 includes only the pretensioner 104, the tether 92 will have a sufficient length so that the curtain airbag 16 can deploy to the deployed condition without any portion of the tether being payed-out from the tensioner. The pretensioner 104 can also be configured to retract portions of the tether 92 as the curtain airbag 16 deploys in order to control the deployment of the curtain airbag and help limit and/or prevent the curtain airbag from deploying outboard of the vehicle side structure 62. Once the curtain airbag 16 reaches the deployed condition, the tether 92 can still be tensioned between the tensioner 86 and the curtain airbag to help limit and/or prevent the curtain airbag from moving outboard of the vehicle side structure 62. The pretensioner 104 in this configuration will also operate in the same manner as described above to control the movement of the curtain airbag 16 when the curtain airbag is in the deployed condition.

Although the apparatus 10 has been described and/or depicted as having one or two tensioners 86 connected to the curtain airbag 16 through an associated tether 92, the apparatus can be configured to have any number of tensioners connected to the curtain airbag through an associated tether. The number of tensioners 86 can be determined based on the vehicle model and/or the curtain airbag construction. Regardless of the number of tensioners 86 provided in the apparatus 10, each tensioner can be positioned on the vehicle centerline 88 so that the curtain airbag 16 can be urged inboard toward the vehicle centerline and away from the vehicle side structure 62. Further, each tensioner 86 of the apparatus 10 can include one or more retractors 102, one or more pretensioners 104, and can be connected to the curtain airbag 16 through one or more tethers 92.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect an occupant of a vehicle, comprising:
   a curtain airbag inflatable from a stored condition adjacent a roof of the vehicle to a deployed condition in which the curtain airbag is configured to be positioned between a side structure of the vehicle and the vehicle occupant;
   a tensioner positioned adjacent to the vehicle roof and spaced inboard from the vehicle side structure; and
   a tether having a first end portion connected to the tensioner and a second end portion connected to the curtain airbag, the tensioner being configured to pay-out and/or retract the tether;
   wherein the tensioner is configured to control pay-out and/or retraction of the tether to control deployment of the curtain airbag and/or to control movement of the curtain airbag once deployed.

2. The apparatus recited in claim 1, wherein the tensioner is configured to retract the tether when the curtain airbag is deployed to urge the curtain airbag in an inboard direction.

3. The apparatus recited in claim 2, wherein the tensioner is configured to increase tension on the tether as the tensioner retracts the tether in order to counteract outboard directed forces exerted onto the deployed curtain airbag.

4. The apparatus recited in claim 3, wherein the first end portion of the tether is connected to a lower portion of the curtain airbag, and wherein the tensioner is configured to retract the tether to limit and/or prevent the lower portion of the curtain airbag from moving outboard of the vehicle.

5. The apparatus recited in claim 2, wherein the tensioner comprises a pretensioner that is actuatable to retract portions of the tether into the tensioner.

6. The apparatus recited in claim 1, wherein the tensioner is configured to limit and/or prevent a portion of the curtain airbag from moving outboard of the vehicle.

7. The apparatus recited in claim 1, wherein the tensioner is positioned on a vehicle centerline, and wherein the tether urges the curtain airbag toward the vehicle centerline as the curtain airbag deploys.

8. The apparatus recited in claim 1, wherein the first end portion of the tether is connected to a lower portion of the curtain airbag, and wherein as the curtain airbag inflates and deploys, the tether is tensioned causing the tensioner to payout the tether, the tensioner being configured to tension the tether during pay-out so that the tensioned tether prevents the lower portion of the curtain airbag from deploying outboard of the vehicle.

9. The apparatus recited in claim 1, wherein the tensioner is positioned in a mounting space between a headliner of the vehicle and the vehicle roof, the stored curtain airbag is mounted adjacent an intersection of the vehicle roof and the vehicle side structure, and wherein the tether extends between the vehicle headliner and the vehicle roof from the tensioner to the stored curtain airbag.

10. The apparatus recited in claim 9, wherein in the deployed condition of the curtain airbag, the tether has a first portion that extends from the mounting space into a passenger compartment of the vehicle and a second portion that extends in the mounting space between the vehicle headliner and the vehicle roof.

11. The apparatus recited in claim 9, wherein in the deployed condition of the curtain airbag, the curtain airbag extends along the vehicle side structure, a first portion of the tether extends from the mounting space along the vehicle side structure with the deployed curtain airbag, and a second portion of the tether extends in the mounting space between the vehicle headliner and the vehicle roof.

12. The apparatus recited in claim 1, wherein when the curtain airbag is in the stored condition, the curtain airbag is rolled and/or folded and a portion of the tether is positioned within rolls and/or folds of the rolled and/or folded curtain airbag.

13. A method of protecting an occupant of a vehicle, comprising:

providing the apparatus recited in claim 1;

inflating the curtain airbag from the stored condition to the deployed condition upon the occurrence of an event for which inflation of the curtain airbag is desired; and actuating the tensioner to retract a portion of the tether into the tensioner prior to or once the deployed curtain airbag is impacted by an outboard directed force;

wherein the tensioner increases tension on the tether as the tensioner retracts the tether in order to counteract the outboard directed force exerted onto the curtain airbag and to limit and/or prevent a portion of the curtain airbag from moving outboard of the vehicle.

14. An airbag module comprising:

the apparatus recited in claim 1; and an inflator operably connected to the curtain airbag for inflating and deploying the curtain airbag from the stored condition to the deployed condition.

15. A vehicle safety system comprising:

the airbag module recited in claim 14; and an airbag controller operatively connected to the inflator and configured to actuate the inflator in response to sensing the occurrence of an event for which occupant protection is desired.

* * * * *